United States Patent [19]

Reid

[11] Patent Number: 4,513,774

[45] Date of Patent: Apr. 30, 1985

[54] APPARATUS FOR MINIMIZING THE AMOUNT OF FLUID LEAKED FROM A COMPONENT IN A HYDRAULIC POWER SYSTEM WHEN THE SYSTEM HAS FAILED

[75] Inventor: Donald J. Reid, Morpeth, England

[73] Assignee: British Gas Corporation, London, England

[21] Appl. No.: 480,306

[22] Filed: Mar. 30, 1983

[51] Int. Cl.[3] .............................................. F16K 21/28

[52] U.S. Cl. .................................... 137/392; 137/559; 137/574

[58] Field of Search ............... 137/392, 571, 573, 574, 137/559; 417/36, 63

[56] References Cited

U.S. PATENT DOCUMENTS

| | | | |
|---|---|---|---|
| 2,318,066 | 5/1943 | Dodd | 417/5 |
| 3,303,785 | 2/1967 | Pearce | 417/36 |
| 3,478,688 | 11/1969 | Lind | 417/36 |
| 4,325,894 | 4/1982 | Date et al. | 137/392 |

*Primary Examiner*—A. Michael Chambers

*Attorney, Agent, or Firm*—Larson and Taylor

[57] ABSTRACT

This invention relates to apparatus for minimizing the amount of fluid leaked from a component in a hydraulic power system when the component has failed.

The apparatus comprises a tank for use as a reservoir for the hydraulic fluid, the tank having a first chamber for storing a main volume of the fluid and a second chamber communicating with the first chamber for storing a reference volume of the fluid. The second chamber is provided with a fluid level switch which deactivates the system power source when the quantity of fluid in the second chamber has fallen to or below a preset level as a result of its leakage from the system via a burst hose or the like. The chambers 2 and 3 are dimensioned so that for a given quantity of fluid entering or leaving the tank, fluid level fluctuation in the second chamber is greater than the corresponding fluid level fluctuation which would occur in the first chamber if the fluid were only entering or leaving the first chamber.

8 Claims, 3 Drawing Figures

APPARATUS FOR MINIMIZING THE AMOUNT OF FLUID LEAKED FROM A COMPONENT IN A HYDRAULIC POWER SYSTEM WHEN THE SYSTEM HAS FAILED

This invention relates to an apparatus for minimising the amount of fluid leaked from a component in a hydraulic power system when the component has failed such as for example a hose-burst.

Hand-held hydraulic tools such as roadbreakers and rock drills are supplied with the hydraulic operating fluid by way of hoses which are connected via power source prime mover such as a diesel or petrol engine to a tank serving as a reservoir for the fluid. Such hoses are subject to severe wear and tear during use and as a result frequently split or crack. Since the hydraulic fluid continuously circulates through these hoses at pressures of at least 200 psi even when the tools are not being operated ie during standby or rest periods, fluid leaks at high velocity through such fissures in the hose wall. This may lead to a quite substantial loss of the expensive operating fluid and will create an unacceptable hazard to the site operatives and the environment.

In some cases the leakage can be kept to tolerably acceptable levels should an operative notice the leak quickly enough and deactivate the prime mover, However, in most cases, and particularly where the hoses are long, the operative may not notice the leak until significant fluid loss has occurred.

It is therefore an object of the present invention to provide an apparatus for minimising the amount of fluid leaked from a component in a hydraulic power system when the component has failed.

According to one aspect of the present invention, there is provided apparatus for minimising the amount of fluid leaked from a component in a hydraulic power system when the component has failed, the apparatus comprising a tank for use as the reservoir for the hydraulic fluid, the tank having a first chamber for storing a main volume of the fluid and a second chamber communicating with the first chamber for storing a reference volume of the fluid above the main volume and means for deactivating the system power source when the quantity of fluid in the second chamber has fallen to or below a preset level as a result of its leakage from the system, the chambers being so dimensioned that for a given quantity of fluid entering or leaving the tank, fluid level fluctuation in the second chamber is greater than the corresponding fluid level fluctuation which would occur in the first chamber if the fluid were only entering or leaving the first chamber.

Preferably the means for deactivating the power source comprises a fluid level switch located in the second chamber.

Suitably the tank includes an expansion chamber communicating with the second chamber.

According to another aspect of the present invention a hydraulic power system includes the apparatus defined above.

Figure 1:
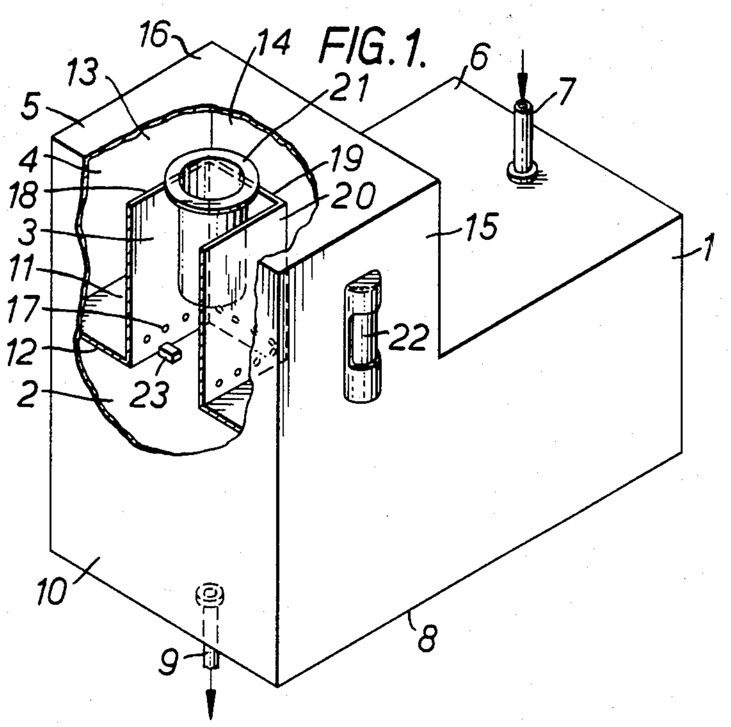
Figure 2:
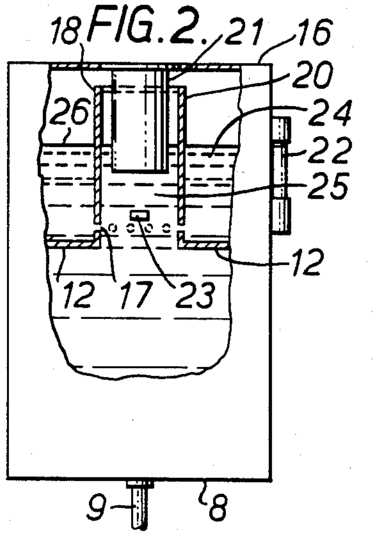
Figure 3:
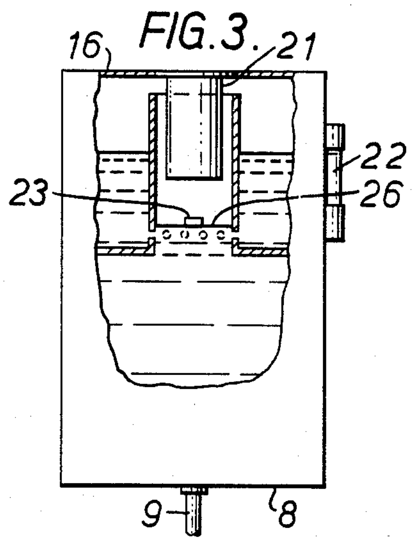

An embodiment of the invention will now be described with reference to the accompanying drawings in which:

FIG. 1 is a perspective schematic view of the apparatus partially cut away at the front to reveal an internal portion thereof, FIG. 2 is a front view of the apparatus showing the fluid level during normal operation and FIG. 3 is a view similar to that shown in FIG. 2 showing the fluid level after shut-down of the system.

The apparatus comprises a tank 1 providing a reservoir for a hydraulic fluid which is to serve as the working fluid in a conventional hydraulic power system incorporating hoses and other like components and a power source such as a diesel or petrol engine.

The tank 1 comprises a lowermost chamber 2 for storing a main or major volume of the fluid, an upper chamber 3 for storing a reference minor volume of the fluid and an upper chamber 4 communicating with the chamber 3 serving as an expansion chamber. The upper chambers 3 and 4 are housed in an extension 5 to the lower most chamber 2.

The top wall 6 of the lowermost chamber 2 is provided with an inlet 7 for fluid returning from the system after use while the lower wall 8 of the chamber 2 is provided with an outlet 9 to supply fluid to the system for use.

The upper chamber 3 is formed between the front wall 10 of the tank 1 and an open-ended vertical channel component 11 which is welded to the wall 10. The expansion chamber 4 is formed within the extension 5 by means of a flange 12 extending from the base of the channel component 11 and welded to the adjacent walls 10,13,14 and 15 of the tank 1.

The channel component 11 terminates short of the top wall 16 of the extension 5 and a series of drain holes 17 is provided in each of the walls 18, 19 and 20 of the component 11 close to the base thereof. The holes 17 provide access for fluid to enter the expansion chamber 4 from the chamber 3 or leave the expansion chamber 4 to enter the chamber 3. Depending from the top wall 16 of the extension 5 is a conventional oil filter element 21 for an oil filter or breather, the element 21 extending into the chamber 3 formed by the channel component 11. Mounted on the wall 15 of the tank 1 is a conventional fluid level gauge 22 to provide a visual indication of the fluid level in the expansion chamber 4. Located at a position just above the drain holes 17 is a conventional fluid level limit switch 23 (shown in schematic form). This switch 23 is electrically connected by means (not shown) to the power source for example, a petrol or diesel engine, so that when the fluid in the chamber 3 falls to the level of the switch 23, the switch 23 switches off the power source to cause circulation of the fluid within the system to cease.

Referring to FIG. 2, during normal operation of the system, the fluid 24 fills the lowermost chamber 2 and forms a column 25 in the chamber 3, above the level of the switch 23. The level 26 of fluid in the chamber 3 remains substantially constant if operation is normal but in any case the fluid column 25 forms a fluid reference volume and because of the relative dimensions of the chambers 2 and 3, fluid level fluctuations in the reference chamber 3 are much greater than those in the lower chamber 2 if the same volume of fluid were entering or leaving only the lower chamber. Hence a small quantity of fluid lost from the main chamber 2 will result in a rapid and considerable change in fluid level in the reference volume.

Referring to FIG. 3, if a leakage occurs in the system as a result of a hose split or the like, fluid 24 will leave the tank 1 and the level 26 of fluid in the reference chamber 3 will fall until it reaches the limit switch as shown in FIG. 3. At this stage, the switch 23 will cut off the power source to prevent further leakage of fluid from the system. The drain holes 17 are dimensioned so as to prevent replenishing of the reference volume from the expansion chamber 3 by ensuring the flow rate through these holes is much less than the loss rate from the reference volume once a serious leak develops in the system.

By suitable selection of the dimensions of the reference chamber 3, the volume of the fluid leaked from the tank 1 during failure of a component can be limited to an extremely low level.

A manual override should be fitted to the fluid level switch to prevent the power source being cut out while topping up the fluid reservoir after maintenance or repairs.

The apparatus substantially eleiminates the problem of fluid expansion through the temperature range associated with outdoor work.

I claim:

1. Apparatus for minimizing the amount of fluid leaked from a component in a hydraulic power system when the component has failed, the apparatus comprising a tank for use as the reservoir for the hydraulic fluid, the tank having a first chamber for storing a main volume of the fluid and a second substantially smaller chamber for storing a substantially smaller reference volume of the fluid than the main volume stored by the first chamber, the second chamber being located immediately above the first chamber and communicating therewith, and means for deactivating the system power source when the quantity of fluid in the second chamber has fallen to or below a preset level as a result of leakage of that fluid from the system, whereby the relative volumes of the chambers are such that for a given quantity of fluid entering or leaving the tank, fluid level fluctuation in the second chamber is greater than the corresponding fluid level fluctuation which would occur in the first chamber if the fluid were only entering or leaving the first chamber.

2. Apparatus as claimed in claim 1 in which the means for deactivating the power source comprises a fluid level sensor located in the second chamber.

3. Apparatus as claimed in claim 1 in which the tank includes an expansion chamber communicating with the second chamber but isolated from the first chamber.

4. Apparatus for minimizing the amount of fluid leaked from a component in a hydraulic power system when the component has failed, the apparatus comprising a tank for use as the reservoir for the hydraulic fluid, the tank having a first chamber for storing a main volume of the fluid, a second chamber communicating with the first chamber for storing a reference volume of fluid, an expansion chamber communicating with the second chamber but isolated from the first chamber and means for deactivating the system power source when the quantity of fluid in the second chamber has fallen to or below a preset level as a result of the leakage of that fluid from the system, the chambers being so dimensioned that for a given quantity of fluid entering or leaving the tank, fluid level fluctuation in the second chamber is greater than the corresponding fluid level fluctuation which would occur in the first chamber if the fluid were only entering or leaving the first chamber.

5. Apparatus as claimed in claim 4 in which the means for deactivating the power source comprises a fluid level switch located in the second chamber.

6. Apparatus for minimizing the amount of fluid leaked from the component in a hydraulic power system when the component has failed, the apparatus comprising a tank for use as the reservoir for the hydraulic fluid, the tank having a first chamber for storing a main volume of the fluid, a second chamber for storing a reference volume of the fluid, the second chamber being located immediately above the first chamber and communicating therewith, an expansion chamber located laterally of the second chamber and above the first chamber, an upper portion of the tank being divided by walls into the second chamber and the expansion chamber, and the second chamber and the expansion chamber communicating with one another through apertures formed in the walls near the bottom thereof, and means for deactivating the system power source when the quantity of fluid in the second chamber has fallen to or below a preset level as a result of the leakage of that fluid from the system, the chambers being so dimensioned that for a given quantity of fluid entering or leaving the tank, the fluid level fluctuation in the second chamber is greater than the corresponding fluid level fluctuation which would occur in the first chamber if the fluid were only entering or leaving the first chamber.

7. Apparatus as claimed in claim 6 in which the means for deactivating the power source comprises a fluid level switch located in the second chamber.

8. A hydraulic power system including apparatus for minimizing the amount of fluid leaked from a component in the hydraulic power system when the component has failed, said apparatus comprising a tank for use as the reservoir for the hydraulic fluid, the tank having a first chamber for storing a main volume of the fluid and a second substantially smaller chamber communicating with the first chamber for storing a substantially smaller reference volume of the fluid than the main volume stored by the first chamber, the second chamber being located immediately above the first chamber and means for deactivating the system power source when the quantity of fluid in the second chamber has fallen to or below a preset level as a result of the leakage of that fluid from the system, whereby the relative volumes of the chambers are such that for a given quantity of fluid entering or leaving the tank, fluid level fluctuation in the second chamber is greater than the corresponding fluid level fluctuation which would occur in the first chamber if the fluid were only entering or leaving the first chamber.

* * * * *